2,929,837
METHOD OF PURIFYING TETRACYCLINE

Hiroshi Ogawa and Shigeharu Inoue, Tokyo, Japan, assignors to American Cyanamid Company, New York, N.Y., a corporation of Maine No Drawing. Application January 30, 1957
Serial No. 637,066

2 Claims. (Cl. 260—501)

This invention relates to a process of purifying tetracycline, particularly when associated with small amounts of chlortetracycline.

Tetracycline is an amphoteric antibiotic which forms salts with acids and bases. Its complete chemical name is 4 - dimethylamino - 1,4,4a,5,5a,6,11,12a - octahydro- 3,6,10,12,12a - pentahydroxy - 6 - methyl - 1,11 - dioxo- 2 - naphthacenecarboxamide. Several methods of purifying impure tetracycline by precipitation as an acid salt, as a salt with a base, or as the free tetracycline from aqueous and organic solvent solutions thereof have been devised. These have not been entirely satisfactory for one reason or another. For example, when tetracycline hydrochloride of very high purity is desired, it can be precipitated from butanol or other alkanols but the yield is not as high as is desirable; and during the long period of time which is required for deposition of the crystals from the solution, some dehydration of the tetracycline due to the presence of excess hydrochloric acid occurs. Furthermore, tetracycline as produced by the several methods now available is usually associated with substantial amounts of chlortetracycline which must be separated from the tetracycline if a pure product is to be obtained.

When tetracycline is produced by the catalytic reduction of chlortetracycline, for instance by the method disclosed in United States Patent No. 2,699,054 to Conover, more or less chlortetracycline remains which cannot be easily and completely separated by recrystallization from the product. When tetracycline is produced by fermentation with microorganisms, as for instance by the process of Minieri et al., United States Patent No. 2,734,018, February 7, 1956, substantial amounts of chlortetracycline may be concurrently formed during the fermentation process if chloride-ion control is not carefully practiced so that the crude product usually contains more chlortetracycline than is desired. Presently available methods of separating small amounts of chlortetracycline from tetracycline are not considered satisfactory and better methods are desired.

The present invention is based upon our discovery that certain dicarboxylic acids, such as oxalic and succinic, can be made to form salts with tetracycline which are much more insoluble than the corresponding salts of chlortetracycline; and these insoluble salts can be precipitated from solution leaving behind substantially all of the chlortetracycline and most of the impurities associated with the product so treated. The solution containing tetracycline in the present invention is meant to contain tetracycline in a dissolved state together with impurities and may be either an aqueous solution or an organic solvent solution. For example, it may be a crude aqueous solution obtained by removing impurities to some extent from a tetracycline fermentation liquor and containing fermentation impurities and chlortetracycline or a solution prepared by dissolving crude tetracycline in acidic water, or any other organic solvents. The tetracycline in the solvent may be in the form of any acidic salt, basic salt or free base. In short, the method of the present invention can be applied to all the cases of obtaining tetracycline in the form of crystals from a solution in which tetracycline is dissolved as stated above.

Generally speaking, the method involves the preliminary step of forming a solution of tetracycline which may be associated with fermentation or other impurities and/or chlortetracycline. This solution should be as concentrated with respect to tetracycline as is practical under the circumstances. The oxalic acid salt of tetracycline, the preferred embodiment of the present invention, has a solubility in water of about 1 to 3 percent at room temperature; and obviously the solution from which the tetracycline is to be recovered must contain more than this minimum amount of tetracycline. The hydrogen ion concentration of the solution may vary from about pH 1 to about pH 5. Hydrogen ion concentrations greater than pH 1 are undesirable in view of the tendency of the antibiotic to degrade in strongly acidic solutions. As the pH of the solution increases up toward neutrality, tetracycline becomes quite insoluble and the process cannot be practiced to advantage when the concentration of the tetracycline is low. pH ranges between about pH 1.5 to pH 3 are preferred. Although sulfuric acid is the preferred acid for adjusting the pH, other acids such as hydrochloric, phosphoric, formic or any other acid which will not form salts of tetracycline more insoluble than tetracycline oxalate but which will reduce the pH to the desired low level may be used.

The solution thus prepared should be clarified by filtration or otherwise to remove insoluble particles, after which the dicarboxylic acid is added in amounts sufficient to form a salt with the tetracycline. An excess of acid does no particular harm, and there may be added to the solution amounts ranging from about 1 mol of acid to about 10 mols for each mol of tetracycline contained therein. Generally speaking, a small excess of the precipitating acid is preferred in order that complete recovery of the tetracycline may be had. About 2 mols of oxalic acid for each mol of tetracycline is considered about optimum. The same considerations also apply when succinic acid is used in the process. In view of the fact that the solution being treated is at an acidic pH, it matters little whether the dicarboxylic acid is added as an acid or in the form of a salt.

Preliminary purification of the crude material is generally considered desirable, although such may not be the case if the process is directed merely to separating tetracycline from chlorotetracycline. These preliminary processes may involve filtration of the fermentation mash to remove mycelia and other insoluble materials and if desired, the antibiotics may be precipitated together or may be extracted from aqueous or organic solvent solutions in which they may be dissolved to partially free them from associated impurities. Several such methods are known to those skilled in the art and are illustrated hereinafter in the specific examples.

Although water is the preferred solvent for preparing the solutions from which tetracycline oxalate is precipitated, a number of organic solvents and solvent systems comprising a mixture of organic solvents and/or water may be used. These solvents should not have an excessive solubility for tetracycline oxalate but should, of course, have the capacity to dissolve large quantities of tetracycline. Among the solvents that may be used in place of water include ethyl acetate, butyl acetate and the alkanols having three to five carbon atoms. The relative solubility of tetracycline oxalate in a number of solvent systems is shown in the following table which may be considered as a guide for selecting suitable solvents.

The pH of the system, excess of oxalate ion and other factors will, of course, change these values considerably.

| Solvent | Temperature, °C. | Time for Extrac'n min. | Potency, γ/ml. |
|---|---|---|---|
| Ethanol | 32 | 30 | 50,000–60,000 |
| n-Propyl alcohol | 30 | 30 | 10,000–17,000 |
| Isopropyl alcohol | 30 | 30 | 500–800 |
| n-Butanol | 31 | 30 | 4,000–7,500 |
| Isopropyl–H₂O (50:50) | 21 | 30 | 25,800 |
| Water saturated w. Butanol | 21 | 30 | 45,800 |
| Do | 4 | 30 | 23,500 |
| Butanol saturated w. Water | 21 | 30 | 6,420 |
| n-Amyl alcohol | 30 | 30 | 1,600–2,200 |
| i-Amyl alcohol | 29 | 30 | 850 |
| Water sat'd w. i-Amyl Alc | 21 | 30 | 35,500 |
| i-Amyl alc. sat'd w. Water | 21 | 30 | 910 |
| Butyl acetate | 30 | 30 | 400 |
| Acetone | 30 | 30 | 4,000 |
| Water | 31 | 30 | 32,500 |
| Do | 4 | 30 | 10,000 |

In addition to the above properties, tetracycline oxalate has a melting point with decomposition ranging between about 140 and 210° C. Microanalysis of a sample of the crystals obtained by one of the following procedures showed carbon, 50.9; hydrogen, 4.6; and nitrogen 4.5. The calculated analysis for tetracycline oxalate crystals having one molecule of water $C_{22}H_{24}N_2O_3 \cdot C_2H_2O_4 \cdot H_2O$ is carbon, 52.2; hydrogen, 5.1; and nitrogen 5.1. The extinction coefficient in 0.1 N sulfuric acid was $E_{1\,cm}^{1\%}$: at 355 mμ 116

The product had an $LD_{50}$ coefficient in the mouse of 243 mg./kg.

Example I

A tetracycline-containing precipitate obtained when a tetracycline fermentation filtrate was made to pH 8.5 was extracted with methanol, made acidic with sulfuric acid (pH 1.5), was decolored with active carbon, had the pH adjusted to 3, was filtered, was condensed under reduced pressure, to make the content of tetracycline about 20 percent and had the methanol distilled away. To the thus obtained aqueous solution was added oxalic acid in an amount about half that of the tetracycline. When the solution was stirred, the oxalate of the tetracycline was readily deposited as crystals. Therefore, the crystals were filtered, washed with water and dried. The crystals were found by a biological test to be of a purity of about 800 gammas per milligram. As a result of paper chromatography, no inhibiting zone of chlorotetracycline was shown at all. The value of the extinction coefficient of the ultraviolet region coincided with that of pure teracycline. The percentage of yield was about 70 percent.

Example II

A free base of tetracycline, as produced by dechlorinating chlortetracycline with hydrogen by using palladium carbon as a catalyst in a publicly known method, was dissolved in sulfuric acid acidic water (pH 1.5) of a concentration of about 30 percent. When oxalic acid or succinic acid or its alkali metal salt was added to the above solution at a ratio of 2 mols per mol of tetracycline, crystals were deposited in a little while. As a result of a biological test, these crystals were found to be of a purity of 800 gammas per milligram. As a result of paper chromatography, no inhibiting zone of chlorotetracycline was shown at all. The mother solution from which the crystals were filtered away showed an inhibiting zone of chlorotetracycline in paper chromatography.

The oxalate or succinate obtained as in the above could be converted into free tetracycline or an acid salt as in the following. That is to say, such salt was suspended in water, an aqueous solution of caustic soda was added thereto and the pH was adjusted to 5. When the solution was stirred, a free base of tetracycline was obtained. When this free base was suspended in butanol, propanol, or ethanol and about 2 mols of concentrated hydrochloric acid were added thereto, said free base once completely dissolved, but when the solution was stirred, the hydrochloride of tetracycline was comparatively easily deposited in the form of crystals.

Example III

When 2.5 grams of a free base of tetracycline obtained by catalytically dechlorinating chlorotetracycline by a publicly known method were suspended in 10 milliliters of water and 0.75 milliliter of 50 percent sulfuric acid was added thereto, the pH became 2 and said free base of tetracycline completely dissolved. The solution was filtered once. As soon as 1 gram of oxalic acid (containing 2 molecules of water of crystallization) was added to the fitrate and was dissolved, crystals were deposited. Thus 2.8 grams of tetracycline oxalate were obtained. The unit was 780 gammas per milligram.

As a result of paper chromatography, said crystals showed no inhibiting zone due to chlorotetracycline at all but the mother solution of crystals showed inhibiting zones of chlorotetracycline and tetracycline.

Example IV

When 2 grams of a free base of tetracycline of Example III were suspended in 7 milliliters of water and 0.5 milliliter of 50 percent sulfuric acid was added thereto, said free base of tetracycline completely dissolved. When 600 milligrams of succinic acid were added to this solution, crystals were deposited. When the crystals were filtered, washed with water and dried, 1.5 grams of tetracycline succinate were obtained. The unit was 800 gammas per milligram. The mother solution showed the presence of chlortetracycline as in Example III.

Example V

A tetracycline fermentation liquor was made acidic with sulfuric acid and filtered. A surface active agent, lauryl dimethyl benzyl ammonium chloride, was added thereto and then the pH was made to 8.5. The precipitate thus obtained was dried and crushed. Sixty grams of such precipitate (containing about 17 grams of tetracycline in which 5 to 10 percent chlortetracycline existed) were extracted three times by using about 300 milliliters of methanol at pH 2 with the addition of oxalic acid. The extracts were added together, treated with active carbon and then filtered. Thus, one liter of the filtrate was obtained. About 12 grams of tetracycline existed as dissolved in the filtrate. When this solution was evaporated to solid below 30° C. under reduced pressure and 15 milliliters of water (or alternatively ethyl acetate or amyl alcohol) were added thereto, tetracycline oxalate was deposited. It was therefore filtered, washed with water and dried. Thus, 11.95 grams of crystals were obtained. The unit was 710 gammas per milligram. The mother solution contained chlortetracycline.

Example VI

Fifty grams of the dried precipitate (containing about 20 grams of tetracycline) treated the same as in Example V was made to pH 1.5 by the addition of concentrated sulfuric acid while being stirred with 500 milliliters of methanol. After being stirred for 1½ hours, the solution was filtered. The residue was further stirred for one hour with the addition of 250 milliliters of methanol and 1 milliliter of sulfuric acid and was then filtered. Both extracts were added together. The resultant extract with the addition of 20 grams of active carbon was stirred for one hour and was then filtered. Then 870 milliliters of the filtrate were obtained. The percentage of extraction was 100 percent.

The pH of this methanol solution was adjusted to 2.5 to 3 with the addition of an aqueous solution of 10 percent caustic soda. The solution was concentrated under reduced pressure to be in an amount of 50 milliliters. The pH of the solution was adjusted to 3 and 25 milliliters of water was added. The solution was further concentrated. After methanol was distilled away, 3.5 grams of oxalic acid were added to the solution. When the solution was stirred, crystals were directly deposited. After being left overnight, the crystals were filtered, washed with water and dried. Thus, 14.4 grams of tetracycline oxalate were obtained. The unit was 800 gammas per milligram.

*Example VII*

When 3.6 grams of a mixture of equal amounts of a free base of crude chlortetracycline and a free base of crude tetracycline were suspended in 8 milliliters of water and 0.6 milliliter of 50 percent sulfuric acid was added thereto, the pH became 2 to 3 and the mixture almost dissolved. The solution was filtered. When the filtrate was stirred with the addition of 1.7 grams of oxalic acid (containing 2 molecules of water of crystallization), the crystals were deposited. After two hours, the oxalate of tetracycline was filtered and 1.4 grams of crystals were obtained. When the filtrate was stirred with the addition of 0.5 milliliter of concentrated hydrochloric acid, the hydrochloride of chlortetracycline gradually crystallized. When the crystals were cooled, left, then filtered, washed with water and dried, 1.6 grams of chlortetracycline hydrochloride were obtained.

*Example VIII*

The cake which was obtained from the acidic filtrate of tetracycline fermentation liquor by adjusting the pH to 8.5 was dried. Fifty grams of dried cake was extracted first by 500 milliliters of methanol containing 5 grams of calcium chloride, second by 250 milliliters of methanol containing 2 grams of calcium chloride. The combined extracted liquor was treated with 15 grams of Darco G-60 and filtered. This filtrate was concentrated to 50 milliliters at 35° C. under vacuum. Then this concentrated liquor was poured into 200 milliliters of water which had 0.5 milliliter lauryl dimethyl benzyl ammonium chloride (50 percent solution) in solution, and the formed precipitate was filtered by the aid of 1.5 grams of Dicalite and washed with water. The filtered cake was suspended in 30 milliliters dilute sulfuric acid and after stirring the solution was filtered, washed with dilute sulfuric acid. To this combined solution (96 ml.), 4 grams of oxalic acid was added under stirring so that tetracycline oxalate crystallized out, which was filtered, washed with water to get 7.4 grams oxalate. The yield was 84 percent.

*Example IX*

Two hundred grams wet cake (equivalent by bioassay to about 7.0 grams tetracycline free base) was extracted three times with water made acidic with 50 percent sulfuric acid. The combined extracted water solution (605 milliliters, 17,200 $\mu$/ml., total 10.3 grams free base) was treated with 14 grams of Darco-G-60 for two hours, then filtered. To this filtrate, 40 grams of $MgCl_2 \cdot 4H_2O$ and 2 milliliters of lauryl dimethyl benzyl ammonium chloride (50 percent solution) were added and the pH was brought to 6.8. The precipitation thus formed was filtered and dissolved by stirring into 20 milliliters of water and 12 milliliters of 50 percent sulfuric acid. The filtered cake was washed thoroughly with acidic water and to this combined water solution 6 grams of oxalic acid was added. The formed oxalate was filtered, washed with water and dried. 12.6 grams of tetracycline oxalate assaying 680 $\mu$/mg. were obtained.

*Example X*

Mixtures were made of tetracycline base, 849 gammas per milligram, and chlortetracycline base 924 gammas per milligram, containing 5 percent, 10 percent, and 20 percent of the latter. A 5 gram sample of each was suspended in 20 milliliters of water and 50 percent sulfuric acid added to dissolve the solids. The pH at this point was 1.8–2.0. To the solutions was added 2.0 grams of solid oxalic acid dihydrate and the acid dissolved. After a few minutes the oxalate began to precipitate. The mixtures were stirred 15 minutes and allowed to stand four hours. They were then filtered, washed with a small quantity of cold water and dried in air.

The yields were as follows:

| Percent CTC in Orig. Sample | Tetracycline Assay, $\gamma$/mg. | Chlortetracycline Assay (Af), $\gamma$/mg. | Percent Recovery |
|---|---|---|---|
| 20 | 700 | <20 | 82.5 |
| 10 | 750 | <20 | 85.0 |
| 5 | 700 | <20 | 85.0 |

We claim:
1. In the process of separating tetracycline from an aqueous solution of tetracycline and chlortetracycline in which the tetracycline is present to the extent of at least 1% by weight, said solution having a hydrogen ion concentration between pH 1–5 and from which the tetracycline is selectively precipitated as an insoluble salt, the improvement which comprises contacting said solution with a compound of the group consisting of oxalic acid and alkali metal salts thereof in an amount ranging from about 1 to about 10 moles for each mole of tetracycline so as to precipitate the tetracycline as tetracycline oxalate, and thereafter recovering the precipitated tetracycline oxalate from said solution.

2. In the process of separating tetracycline from an aqueous solution of tetracycline and chlortetracycline in which the tetracycline is present to the extent of at least 1% by weight, said solution having a hydrogen ion concentration between pH 1–5 and from which the tetracycline is selectively precipitated as an insoluble salt, the improvement which comprises contacting said solution with a compound of the group consisting of succinic acid and alkali metal salts thereof in an amount ranging from about 1 to about 10 moles for each mole of tetracycline so as to precipitate the tetracycline as tetracycline succinate, and thereafter recovering the precipitated tetracycline succinate from said solution.

References Cited in the file of this patent

UNITED STATES PATENTS

| | | |
|---|---|---|
| 2,699,054 | Conover | Jan. 11, 1955 |
| 2,734,018 | Minieri | Feb. 7, 1956 |
| 2,739,924 | Lein | Mar. 27, 1956 |

FOREIGN PATENTS

| | | |
|---|---|---|
| 167,750 | Australia | May 6, 1954 |
| 525,518 | Belgium | Jan. 30, 1954 |
| 538,487 | Belgium | May 26, 1955 |
| 521,467 | Canada | Feb. 7, 1956 |
| 1,097,703 | France | Feb. 25, 1955 |

OTHER REFERENCES

Van Dyck: Antibiotics and Chemotherapy, vol. 2, No. 4 (1952), pp. 192, 195.